United States Patent [19]

Dowbenko

[11] 3,907,623
[45] Sept. 23, 1975

[54] POLYMER CURING SYSTEM
[75] Inventor: Rostyslaw Dowbenko, Gibsonia, Pa.
[73] Assignee: PPG Industries, Inc., Pittsburgh, Pa.
[22] Filed: Apr. 4, 1973
[21] Appl. No.: 347,985

[52] U.S. Cl. ............... 156/77; 156/155; 156/305; 156/307; 156/309; 156/330; 427/243; 427/264; 427/352; 428/306; 428/307; 428/413; 428/415
[51] Int. Cl.² ........................................... C09J 5/02
[58] Field of Search ........... 156/330, 305, 306, 307, 156/309, 310, 77, 155; 260/2.5 M, 2.5 D; 161/159, 184, 188, 160; 117/62.2, 66, 98, 27, 126 GB, 8, 62.1, 309

[56] References Cited
UNITED STATES PATENTS

| | | | |
|---|---|---|---|
| 3,216,882 | 11/1965 | Feldt et al. | 117/98 |
| 3,218,190 | 11/1965 | Patterson et al. | 117/126 GB |
| 3,390,037 | 6/1963 | Christie | 161/188 |
| 3,490,936 | 1/1970 | Cole et al. | 117/62.2 |
| 3,544,489 | 12/1970 | Doubenko et al. | 260/21 |
| 3,577,257 | 5/1971 | Hutzler | 117/27 |
| 3,682,848 | 8/1972 | Virnelson | 260/2.5 M |
| 3,749,591 | 7/1973 | Hider et al. | 117/98 |
| 3,778,536 | 12/1973 | Smearing | 156/330 |

FOREIGN PATENTS OR APPLICATIONS
1,014,895   12/1965   United Kingdom

*Primary Examiner*—Charles E. Van Horn
*Assistant Examiner*—Michael W. Ball
*Attorney, Agent, or Firm*—Frank J. Troy

[57] ABSTRACT

Microporous films are charged with selected polymer curing agents and brought into contact with a curable material to thereby crosslink it. Specific curable materials useful both for the microporous film and the curable polymer include epoxy resins which form strong adhesive bonding systems in various environments.

6 Claims, 1 Drawing Figure

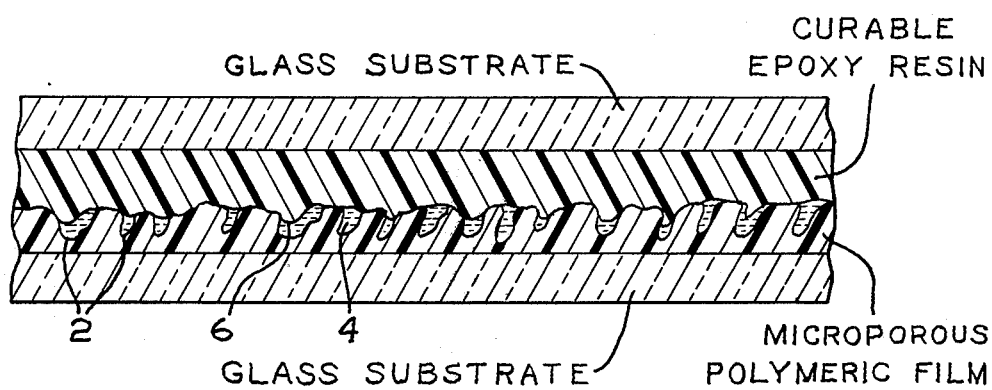

POLYMER CURING SYSTEM

BACKGROUND OF THE INVENTION

This invention relates to systems for curing polymers or other curable materials. More specifically, this invention relates to unique systems for curing various materials, particularly polymers by contacting them with a microporous film charged with a curing agent.

Polymer curing is a technique which is well-known and understood in the art. Basically, it may be said that polymer curing is the phenomenon of converting a generally two-dimensional or non-crosslinked polymer chain into a three dimensional or crosslinked polymer chain or molecule. The crosslinking or curing of an uncured polymer affects many of its basic properties, such as strength, toughness, heat resistance, extrudability, moldability, flexibility, adhesiveness, chemical resistance, dielectric characteristics, and the like. Thus, the phenomenon of curing is an extremely important industrial technique.

The curing of any given polymer is usually achieved by one of two basic techniques. The first technique is usually referred to as a thermal or heat-curing process. As the name implies, this technique provides for simply heating a polymer system, whereupon, due to the selection of initial ingredients, a polymer chain of the system crosslinks with other polymer chains in the system to effect a three-dimensional molecule or polymer.

The second technique requires the addition of a curing agent to the system. This curing agent may be in the form of a coupling or additive agent, i.e., where the agent itself forms a part of the crosslinkage, or it may merely be a catalyst (or accelerator) which initiates an auto-crosslinking among the two-dimensional chains. Very often the above two techniques are combined so as to achieve an even more favorable curing process. The ability to cure particular polymers has opened wide vistas for the polymer chemist and the polymer industry as a whole since it has enabled polymers to be effectively used in such widely diversified fields as adhesives, protective coatings, reinforcements, molded articles, extruded articles, casting and plastic tooling, thermal insulation, chemical insulation, and the like.

Of special interest to the polymer industry had been the relatively recent development of certain polymers known as "epoxy resins". Epoxy resins are now well-known in the industry and are commonly formed by reacting epichlorohydrin with bisphenol A (4,4-isopropylidene diphenol). Recently other hydrins and polyols have been developed and used as substitutes for the above ingredients to obtain various selected properties. For example, various aliphatic glycols and novolac resins may be used in place of the bisphenol. The use of novolac resins generally increases the heat resistance of an epoxy resin. Furthermore, various additives and modifiers have been developed and may be added to the basic epoxy resins to vary their properties. Such additives and modifiers are well-known in the art. For example, epoxy-phenolic resin systems exhibit extreme hardness and chemical resistance while blends of epoxy resins with various nylons exhibit extremely good shear-strength characteristics.

It may generally be stated that epoxy resins are curable materials which achieve their best characteristics and thus are most useful when cured. Although certain of these resins can theoretically be cured by the addition of heat alone, the most useful resins require the addition of a curing agent either with or without heat to effect a useful amount of crosslinking. The curing agents used are well-known in the art and may be divided into four basic groups: (1) amine type, (2) acidic type, (3) aldehyde condensation products, and (4) Lewis acid catalysts. Examples of amine type curing agents are aliphatic and aromatic amines, polyamides, tertiary amines, and amine adducts. Acid type curing agents include both acids and acid anhydrides, while the aldehyde condensation products generally envisioned are the phenol-, urea-, and melamine-formaldehyde resins. The Lewis acid catalysts usually take the form of complexes such as the complex of boron trifuloride with various amines such as piperidine or monoethylamine.

Of particular interest in the epoxy resin industry has been the ability of various epoxy resins and epoxy resin systems to form extremely strong adhesive bonds upon curing. The adhesive properties of these resins when cured have been found so good that they have been used in metal-to-metal, glass-to-glass, and wood-to-wood bonding as well as in printed circuits and body solders. In some instances, epoxy adhesives have replaced brazing and soldering in the metal-to-metal bonding area.

Acceptability of epoxy resins in the adhesive are stems from various unique properties exhibited by these resins. For example, they are stronger than phenolic resins; they are virtually 100 percent reactive with no volatiles evolved during cure; they have excellent flow characteristics and require only slight pressure to force sufficient adhering contact; and they are suitable for a wide variety of environments since a great number of curing agents are available for them and a great number of modifiers are compatible with them.

One of the drawbacks to epoxy resin adhesive systems which has heretofore troubled the art, is the need for a "two-package" system. That is to say, heretofore, in order to bond two substrates together, a curing agent and an uncured epoxy resin system, each provided in separate containers, had to be mixed just prior to bonding and applied as a mixture to the interface of the surfaces to be bonded. The need to premix and apply the resin curing agent system before significant curing or crosslinking has occurred is a definite detriment since it removes a degree of flexibility from the bonding process. Such a detriment is especially acute when using the commercially desirable epoxy resin systems which cure rapidly.

Microporous films containing a plurality of discrete open voids are generally well-known in the art. Although these films may be made from a variety of well-known materials, they are generally made from natural or synthetic polymeric materials. The voids formed therein have generally been used for various purposes such as to lend opacity to the film, to hold a printing dye or dye intermediate for manifold use, to effect a slow release of perfumes, to act as an ion membrane fuel cell or to act as a semi-permeable coating.

One known method of making microporous open void films as above described is to dissolve a thermoplastic, water-insoluble polymer and a linear polypolar polymer into a single common polar organic solvent. The solution is then applied as a film to a substrate and contacted with water for a period of time sufficient to displace the organic solvent from the film. After treatment with water the film is dried until substantially all the water is removed. The resulting film is microporous and contains a plurality of discrete, open voids capable of being charged with a variety of substances.

Another known method of making microporous films is to prepare an aqueous dispersion of a polymer and a water-soluble organic solvent for the polymer which boils above 100°C. and which is present in a concentration that is insufficient to dissolve the polymer. This dispersed mixture is then coated on a substrate as a film and a substantial amount of the water is removed by evaporation below 100°C. until partial coalescence of the polymer occurs as indicated by substantial clarification with tackiness. This tacky film is then washed with water or another liquid in which the polymer is insoluble but which dissolves the solvent for the polymer, to produce a coherent film substantially free from dissolved polymer and organic solvent. After this wash with water, etc., the film is dried at a temperature below its softening point. Such a film is found to contain a plurality of discrete open voids.

Although the above-disclosed prior art techniques do provide microporous films, superior microporous films containing a plurality of discrete open voids and capable of being charged with various materials may be made by the technique disclosed in Applicant's U.S. Pat. No. 3,544,489, the entire disclosure of which is incorporated herein by reference. Basically, this technique comprises forming a film of the composition comprising (a) a thermosetting resin and (b) a solvent-extractable thermoplastic resin, which resins are at least partially compatible, and subsequently curing the thermosetting resin, such as by heating. Upon curing of the thermosetting resin, the thermoplastic resin forms minute, discrete particles in the thermoset resin matrix. The thermoplastic resin is then extracted from the film such as by means of a suitable solvent for the thermoplastic. There is thus obtained an opaque chargeable film of the thermoset resin which is substantially continuous and contains a large number of discrete, open voids.

SUMMARY OF THE INVENTION

This invention provides a novel film and technique for curing polymers. This invention further provides a novel bonding system for adhering two or more substrates together.

This invention also provides a novel film, bonding system, and a coating and curing technique which eliminates the need to mix a curing agent with a resin (e.g., an epoxy resin system) from a two-package system at the time of application.

The novel film provided by this invention is a microporous film capable of being formed upon a substrate and containing discrete open voids having located therein a curing agent for a selected curable polymer or polymer system. By contacting the curable polymer with the open void film containing a curing agent therein, the polymer is cured, either with or without heating depending upon the polymer and curing agent chosen.

The novel bonding system and technique provided by this invention comprises forming the above-described novel film on a surface to be bonded to another substrate or surface, then locating between the surfaces to be bonded, a polymer, such as an epoxy resin or a butylated melamine-formaldehyde resin which will form an adhesive bond between the two surfaces when cured. When the curable polymer is brought into contact with the film, the polymer is cured and an adhesive bonding of the two surfaces is effected.

BRIEF DESCRIPTION OF THE DRAWING

The FIGURE presented is a greatly enlarged cross-sectional illustration of one type of novel film of this invention used in an epoxy resin bonding system wherein the two surfaces or substrates are glass.

DETAILED DESCRIPTION OF THE INVENTION

Basically, the novel film provided by this invention is a film which contains a plurality of open, discrete voids having located therein a curing agent for a selected curable material, such as a polymer or polymer system.

Although the film may be formed from a wide variety of naturally-occurring and synthetic materials, generally speaking polymeric materials are preferred. Such polymeric materials are well-known in the art and include both natural and synthetic polymers, either alone or admixed with various fillers, plasticizers, coalescers, dyes, pigments, and the like. The polymers may be thermoplastic or thermosetting. If thermosetting they may be heat-curable, agent-curable, or require both heat and a curing agent to cure them. Some examples of naturally-occurring materials, some of which are polymeric, are casein, bentonite (a clay which swells in water); alpha protein, shellac, gelatin, animal glue, sodium silicate, and natural rubber. Examples of applicable synthetic polymers, both thermoplastic and thermosetting, are found in Applicant's U.S. Pat. No. 3,544,489.

As will hereinafter be discussed, a preferred group of synthetic polymers for the purposes of this invention are the well-known epoxy resins such as those obtained by the combination of bisphenol A and epichlorohydrin in combination with a curing agent such as ethylene diamine. The epoxy resins contemplated also include the well-known epoxylated drying oils, the glycidyl ethers of glycerol, epoxylated novolac resins, etc., as well as including various mixtures of epoxy resins and other resins or modifiers to form an epoxy resin system.

Films which are microporous and which have a plurality of discrete open voids located therewithin may be made in a number of ways. For example, the prior art techniques hereinbefore discussed and generally disclosed in U.S. Pat. Nos. 2,848,752; 2,957,791; and 3,216,882 may be used to form microporous films which are capable of being charged with a curing agent according to the teachings of this invention.

Although these prior art techniques have proved useful in the practice of this invention, the technique disclosed in U.S. Pat. No. 3,544,489 is preferred over the prior art techniques because of its many advantages. This technique, generally described as a thermoplastic solvent extraction technique, basically comprises applying as a film to a substrate, a composition comprising (a) a thermosetting resin and (b) a solvent-extractable thermoplastic resin, which resins are at least partially compatible, and subsequently curing the thermosetting resin, such as by heating. Upon curing of the thermosetting resin, the thermoplastic resin forms minute, discrete particles in the thermoset resin matrix. The thermoplastic resin is then extracted from the film, such as by means of a suitable solvent for the thermoplastic resin. There is thus obtained an opaque film of the thermoset resin. The film is continuous and contains a large number of open voids.

The leaching or extracting of the thermoplastic resin from the matrix of the cured thermosetting resin may be done by various convenient techniques, as for example by immersion. The length of time the coating is contacted with the solvent is not critical so long as it is sufficient to extract the thermoplastic resin. It is preferred that at least 75 percent of weight of the thermoplastic resin contents present in the matrix be extracted. It is also preferred that the amount of thermoplastic resin which is extracted be at least about 10 percent by total weight of the film before extraction. These amounts are in no way critical, however, since the only limitation on the amount of thermoplastic extracted is that it be sufficient to provide a sufficient number of voids so that the film can be charged with enough curing agent to effect a cure of a selected polymer. Generally, the film is contacted with the solvent for from 1 to 20 minutes and, preferably, for about 2 minutes at room temperature. The film is then dried to remove the residual solvent to thereby form a microporous film of the thermoset resin which contains a plurality of discrete open voids capable of being charged with a polymer curing agent.

The compatible thermosetting and thermoplastic resins may be mixed together in a variety of ways. For example, they may be mixed in a liquid vehicle or formed into a homogeneous mixture of finely-divided particles of the two resins. In the former instance, the mixture may be applied as a film to a substrate as by brushing, dipping, roller coating, knife coating, etc. The film is then air-dried to remove a portion of the liquid vehicle and it is then cured as by heating to crosslink the thermosetting resin. In the latter instance, the mixture may be applied as a powder coating to a substrate. The mixture of powdered resins is then heated to form a melt of the two resins and to cure the thermosetting resin. The minute, discrete particles of thermoplastic resin which are thereby formed in the thermoset resin matrix are then extracted therefrom as previously described to obtain a microporous film.

The films produced by the practice of this technique are characterized by the presence therein of a large number of minute, discrete voids which render the films, before being charged with a curing agent, substantially pure white. The voids in the films may be substantially globular in shape or threadlike (i.e., having substantially greater length than diameter). The average diameter of the voids is usually less than about 1.0 micron. The lengths of the threadlike voids are generally less than about 3 microns.

Regardless of the technique used to obtain a microporous film, such a film only becomes useful for the purposes of this invention when its voids are charged or loaded with a curing agent for a selected polymer that is to be cured.

Charging or loading the above-described films (i.e., its voids) may be done in a number of ways as, for example, by brushing, spraying, or dipping the films with or into a liquid containing a curing agent. The term "a curing agent" is used in this invention in its broadest sense in that it is a term used to define hardeners, catalysts (including accelerators) and additive agents. A curing agent may be a single curing agent or a mixture of a curing agent with other curing agents, modifiers, and/or the like. The curing agents cure or harden the polymers or reactive materials herein by crosslinking, polymerizing, catalyzing, accelerating, or the like.

Curing agents are well-known in the art and may exist either as liquids or solids at room temperature. If the curing agent or mixtures thereof used are liquids of sufficiently low viscosities so as to be capable of directly charging the open voids of a film, the film may be sprayed or brushed, etc., with these agents without the need for liquid vehicles. In instances where the curing agents are solids or viscous liquids, they may be dispersed or dissolved in suitable liquid vehicles which may then be sprayed or otherwise introduced into the voids of the film. The vehicle may be removed by evaporation if desired or left in the film. One simple method which generally achieves adequate loading of the films of this invention is by dipping the film into a solution of a curing agent for from about 1 to about 25 minutes.

The microporous films formed by the above-described technique in U.S. Pat. No. 3,544,489 provide a unique manner of indicating when they are charged. As disclosed in this above-cited application, the films formed are opaque and almost pure white once the thermoplastic resin has been removed due to empty voids therein. Upon charging or loading of these voids with a curing agent in liquid solution, or dispersion form, the films tend to return to a transparent or translucent state. Thus, when films made by this technique are used, they are charged either by brushing, spraying, dipping, etc., for a sufficient period of time to render them transparent or translucent, i.e., until they approach the degree of light transmittance that the films exhibited prior to the extraction of the thermoplastic resin. Examples of various thermosetting and at least partially-compatible thermoplastic resins are well document in the above-cited United States patent, and include admixtures of interpolymers of hydroxyl esters of ethylenically unsaturated acids with at least one other polymerizable ethylenically unsaturated monomer and a crosslinking agent such as an aminoplast resin; alkyd resins; phenoplast resins; carboxylic acid amides interpolymers; cellulose derivatives; copolymers of acrylates and the like.

It is understood, of course, that a film need not be on the substrate when charged since in many instances the microporous films may be stripped from the substrate upon which they were formed in a known manner to be used as a film alone. Such a film obviously is beneficial since it is easier to handle and more easily chargeable, especially when using the dipping technique.

The choice of curing agent will depend upon the polymer to be cured. Generally speaking, curing agents or, defined another way, crosslinking agents, encompass a wide range of chemical compounds. Curing agents, whether they be catalysts (crosslinking accelerators) or agents which actually enter into the three-dimensional polymer chain, are well-known in the art. The choice of a given curing agent is therefore well within the ingenuity of the skilled artisan once given the polymer to be cured.

Whether attached to a substrate or existing alone, the charged films constitute one embodiment of this invention and become useful in the general technique of curing polymers. The curing of a particular polymer or polymer system may be effected by simply contacting the film with an uncured polymer. In certain instances the polymer, if provided in the form of a liquid or paste-like substance, will actually tend to migrate into the voids and thus come into intimate contact with a large amount of the curing agent. This migration technique is especially useful when using curing agents that actually enter into the crosslinking reaction and the final three-dimensional polymer (i.e., coupling or additive agents). In other instances, migration is neither effected nor necessary, as, for example, when the curing agent used is a cross-linking catalyst and the curable polymer is semi-rigid or semi-solid. In these latter instances it is often helpful to use a liquid curing agent of low viscosity so that upon contacting the curable polymer with the charged film, gravity and/or agitation will cause the curing agent to flow into contact with the polymer.

The actual mechanics of curing a polymer may be carried out in a variety of ways depending upon the environment, form and shape of the film and polymer system. For example, if the polymer to be cured is a protective thermosetting polymer coating on a structure such as an automobile, home appliance, etc., it may be cured by covering the structure with a cloth of asbestos or other fabric which has coated thereon a film of this invention which has been charged by dipping the coated cloth into a bath of a suitable curing agent. The cloth may then be weighted down, if necessary, and the structure subjected to heat (in the case of heat-curable polymers) for a sufficient period of time to cure the polymer thereon. The cloth is then removed and may be recharged for use on another structure.

Curable materials which may be cured in the manner of this invention are well-known in the art and generally comprise those polymers or polymer-forming materials known to require a curing agent in order to be crosslinked. Some examples of these curable polymers are admixtures of interpolymers of hydroxyl esters of ethylenically unsaturated acids with at least one other polymerizable, ethylenically-unsaturated monomer. Such polymers may be crosslinked by using a polyisocyanate, such as toluene diisocyanate, as a curing agent. Other curable materials in combination with catalysts, curing agent or crosslinking agent include alkyl acrylate or methacrylate monomers such as methyl methacrylate and the like in combination with benzoyl peroxide, N,N-dimethylaminotoluidine; styrene/polyester-benzoyl; ~SH compounds plus a free radical amine catal or an allyl radical; silicones with an amine catal; divinyl ethers in the presence of a Lewis acid; di or polyamines, diols or polyols plus isocyanates and the like.

Examples of monomer systems used to produce these interpolymers are those containing hydroxyalkyl esters in which the alkyl group has up to about 12 carbon atoms, as for example, esters of acrylic acid and methacrylic acid esters of glycol and 1,2-propylene glycol, i.e., hydroxyethyl acrylate and methacrylate, and hydroxypropyl acrylate and methacrylate. Combinations of these esters may also be used.

Examples of monomers with which the hydroxyalkyl ester is interpolymerized include an ethylenic compound copolymerizable with the ester, the polymerization taking place through the ethylenically-unsaturated linkages. These include such monomers as styrene, 1,3-butadiene,2-chlorobutene, alpha-methylstyrene, alpha-chlorostyrene, 2-chloro-1,3-butadiene, and the like.

Other examples of polymers curable in the manner of this invention are such polymers as the well-known phenoplasts (i.e., phenol-formaldehyde condensates) which may be cured using such catalytic curing agents (i.e., accelerators) as calcium oxide and/or magnesium oxide, and the well-known aminoplasts, (i.e., urea- and melamine-formaldehyde condensates) which may be cured by using such curing agents as benzoic acid, phthalic anhydride, chloroacetamide, tetrachlorophthalic anhydride, triethanolamine hydrochloride, and peracid salts, e.g., guanadine persulfate. Vulcanizable rubbers generally and polysulfide rubber formulations more specifically may also be cured by this invention, the latter using stearic acid (i.e., used to develop full cures) or p-quinone dioxime mixed with zinc oxide as a curing agent. Such polysulfide rubbers also include the Thiokols, which have rubber-like properties. Other examples include the well-known silicone polymers represented by the formula:

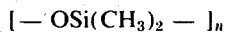

Such polymers may be cured, although only over an extended period of time, with benzoyl peroxide.

All of the above polymers, as well as their preparation, are well-known in the art. For purposes of this invention, any of the well-known preparation processes may be used, provided that such a process does not in and of itself cure the polymer, but rather provides a curable material.

A preferred group of curable polymers for the purposes of this invention, and one which has proven extremely useful in the area of adhesive bonding, is that group of polymers known as "epoxy resins". Epoxy resins are generally characterized by the presence therein of an epoxy group,

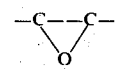

As already alluded to hereinabove, epoxy resins are usually made by reacting epichlorohydrin with Bisphenol A (4,4'-isopropylidenediphenol) in a well-known manner to produce an epoxy resin when cured. Various substitutes for the hydrin and bisphenol have recently been developed which can be used to achieve epoxy resins having varying properties. Epoxy resins may also exist as epoxy resin systems in that they may have various additives mixed therewith, such as other resins, plasticizers, modifiers, fillers, etc. All of these resins may be said to be generally applicable for use in this invention.

Excellent discussions of epoxy resins, their preparation, modification and uses may be found in Schildknecht, POLYMER PROCESSES, Volume X, Chapter X, Interscience Publishers, Inc., New York (1956) and Kirk-Othmer, ENCYCLOPEDIA OF CHEMICAL TECHNOLOGY, Second Edition, Volume 8, pages 294-312, Interscience Publishers, Inc., New York (1956).

Although these resins are useful in the areas of coating and protective laminating on various structures such as home appliances and the like, and thus may be cured in the manner of this invention as hereinbefore described with respect to coated curable polymers generally, these resins are used most preferably in this invention to form a unique adhesive bonding system and technique.

The adhesive bonding system contemplated by this invention comprises a microporous polymeric film containing a plurality of discrete, open voids made as described above from any of the polymeric materials hereinabove described. Within these voids, there is located a curing agent, as defined above, for an epoxy resin or epoxy resin system. This bonding system also includes an epoxy resin (or epoxy resin system) which when brought into contact with the microporous polymeric film will be cured by the curing agent and form an adhesive bond.

The FIG. I represents one form of this unique bonding system. In this figure, there is illustrated two glass substrates, such as ordinary soda-lime glass plates, bonded together by a curable epoxy resin in contact with microporous film, where the microporous film is made by the thermoplastic extraction process as above described. Discrete, open voids 2 are filled or charged with an appropriate curing agent 4. The curable epoxy resin, in paste or spreadable form, tends to migrate or flow into the voids 2 as illustrated at 6 and come into intimate contact with curing agent 4 to thus be cured and form a strong adhesive bond between the glass substrates.

Although it is most preferable to use a microporous film formed of an epoxy resin system in order to achieve maximum bonding strength, such is not absolutely necessary since epopxy resins when cured usually form strong adhesive bonds with other polymeric porous materials as well. Thus, the microporous film may be made by any of the techniques described above using the various natural and synthetic polymers well known in the art.

Since an adhesive bonding system is only as good as its weakest bond, when using microporous polymeric films other than epoxy resins, and especially polymeric films which do not bond well to the substrate upon which the film is located, the film need not be spread over the entire surface of the substrate. In this embodiment, the film, charged with a catalyst curing agent, is spread as a thin strip on a relatively small area of the substrate, such that when the film is contacted with the curable epoxy resin system, the system will flow around the strip and contact a part of the substrate. Thus, when the epoxy system is cured, a substrate-epoxy-substrate bond is formed as in the FIGURE without the intervention of another polymer which effects a weaker adhesive bond.

Adhesive epoxy resins systems applicable for use in this invention are well-known in the art. They include both heat-curing thermosetting and cold-setting systems. An example of a cold-setting epoxy resins system is found in U.S. Pat. No. 2,548,447. Basically this system comprises a spreadable fluid solution of glycidyl ether (epoxy resin) formed by reacting epichlorohydrin with a dihydric phenol, such as Bisphenol A and the like, in admixture with a fluidizing proportion of a normally liquid, cyano-substituted hydrocarbon, such as acetonitrile. Curing agents for this system include triethylamine, ethylenediamine, diethylamine, diethylenetriamine, triethylenetetramine, 2,4-diamino-2-methylpentane (diacetone diamine), dicyandiamide, melamine and pyridine.

For the purposes of this invention, these curing agents would be first located within a microporous film by techniques hereinbefore described and the film would then be brought into contact with the epoxy resins system.

Other examples of cold-setting epoxy systems which may be adapted in the same manner as the above-described system so as to be usable in this invention are those systems found in U.S. Pat. Nos. 2,528,932 and 2,528,934.

An example of a thermosetting epoxy resin system which may be used in this invention is found in U.S. Pat. No. 2,500,449. Basically, this patent discloses the curing of a glycidyl ether of bis(4-hydroxyphenyl)-2,2-propane having a 1,2-epoxy equivalency greater than one at temperatures of about 150°C. with oxalic acid as a curing agent. For purposes of this invention, the oxalic acid is charged in solution form into the voids of a microporous film whereinafter the epoxy resin is brought into contact with the film and heated to cure.

The actual mechanics of bonding two substrates together generally comprises first forming on one of the substrates a microporous film as hereinabove described, then filling the voids of the film with an appropriate curing agent for an epoxy resin system as by brushing, dipping, or spraying the curing agent onto and into the film. Next, a layer of a curable but uncured epoxy resin system is provided between the charged film and the other substrate. This may be done by spreading the epoxy resin onto either the film or the other substrate. In the former instance, the substrate must be quickly brought into contact with the resin so that the resin is not substantially cured prior to contact. The latter instance, wherein the epoxy and curing agent are separated, is preferred since time is not of the essence. In either instance, it is always preferable to spread the epoxy as thin as possible while still effecting an acceptably strong bond upon curing. This is done not only for economy, but to provide a proper or necessary ratio of curing agent to epoxy resin. Such a ratio becomes important when using coupling or additive curing agents rather than catalytic curing agents (i.e., accelerators). It is, of course, understood that the thickness of epoxy and amount of curing agent may be routinely varied to meet the requirements of a given adhesive system. Generally speaking, however, epoxy thicknesses of less than 2.0 millimeters and preferably less than 1.0 millimeter are found useful for producing adequately strong bonds between most substrates.

The following examples which are presented to depict the best modes contemplated for carrying out the above-described invention are provided for illustrative purposes and not as limitations upon the scope of this invention. In these examples, all parts are by weight unless otherwise specified.

EXAMPLE I

A butylated melamine-formaldehyde resin was prepared by admixing 1000 parts of a butyl alcohol solution of formaldehyde (40 percent formaldehyde) and 705 parts of butanol. The acid number of this charge was adjusted to from about 0.25 to 0.29 and there were then added 340 parts of melamine. The charge was heated at between about 210°F. and 225°F. for 9 hours and there was then added 8 parts of sodium carbonate and 41 parts of butanol. The mixture was then heated to distill the butanol. The reaction mixture is diluted with sufficient xylene and butanol to give a solution comprising 50 percent solids, the solvent comprising a 1:1 mixture of xylene and butanol. The butylated melamine-formaldehyde resin in the solution contains a mole ratio of melamine:formaldehyde:butanol of 1.1:5.5:6.0.

A composition was prepared by mixing 60.0 parts of a solution of an acrylic interpolymer obtained by copolymerizing a mixture comprising 30 percent styrene, 30 percent 2-ethylhexyl acrylate, 18 percent methyl methacrylate, 11 percent butyl methacrylate, 4 percent hydroxyethyl methacrylate, 4 percent hydroxypropyl methacrylate and 3 percent methacrylic acid, one third of the methacrylic acid being previously reacted with ethylenimine. The solution of the interpolymer comprised 60 percent solids and 40 percent of a solvent composed of 15 percent butanol, 62 percent toluene and 23 percent xylene. To the mixture of the two resins there were added 70.0 parts of a solution comprising 50 percent xylene and 50 percent of a thermoplastic acrylate copolymer obtained by copolymerizing 10 percent butyl glycidyl fumarate, 45 percent 2-ethylhexyl acrylate and 45 percent methyl methacrylate. The resulting mixture was sprayed onto a steel panel, the panel was air dried for ½ hour and then baked at 325°F. for ½ hour to cure the thermosetting resin composition. A translucent film was thus obtained, which is cooled to room temperature and then immersed in xylene for 2 minutes to extract the minute, discrete particles of the thermoplastic resin from the thermoset resin matrix. After evaporation of the xylene from the film, an opaque, microporous film was obtained.

Several panels containing a microporous film described hereinabove were soaked by dipping in solutions of methyl ethyl ketone peroxide of the following concentrations: (diluted by taking 60 percent methyl ethyl ketone peroxide in dimethyl maleate). Three solutions were made as follows:

A. 10 parts methyl ethyl ketone peroxide in 90 parts xylene
B. 20 parts methyl ethyl ketone peroxide in 80 parts xylene
C. 10 parts methyl ethyl ketone peroxide in 10 parts xylene.

After withdrawing the panels which were soaked in each of these solutions, the panels having a microporous film thereon were then charged with a methyl ethyl ketone peroxide and permitted to dry. Then a curable oil-free alkyd resin was applied to these charged microporous films by means of a draw-down bar, and the films so provided were allowed to dry at room temperature. The approximate drying times in order to provide a tack-free film were as follows:

A. 1 hour
B. 30 minutes
C. 20 minutes

The films so provided had a pleasing, non-glossy appearance.

The curable polymer hereinabove was an unsaturated alkyd resin comprised of the following components: 65 parts of a reaction product comprising 3 moles of phthalic anhydride, 2 moles of maleic anhydride, 4.1 moles of propylene glycol, 1.4 moles of diethylene glycol, 35 parts styrene, 0.012 part of hydroquinone, 0.05 part of paraffin wax, and 0.21 part of cobalt octoate.

It will be noted that the unsaturated alkyd resin may first be applied to a glass substrate or the like and then brought in contact with the charged microporous, polymeric film to provide a system similar to that represented in the drawing.

EXAMPLE II

In this Example, a microporous film was charged with toluene diisocyanate and employed to cure an acrylic polyamine resin. The microporous film was prepared from a composition comprising a mixture of 9.0 parts of a solution of butylated melamine-formaldehyde resin prepared as described in Example I, 10.5 parts of a solution of a carboxylic acid amide interpolymer, said interpolymer comprising a copolymer of 20 percent N-butoxy-methacrylamide, 2 percent acrylic acid and 78 percent styrene (50 percent solids in a solvent mixture comprising 23 percent xylene, 11 percent butanol and 66 percent Solvesso 150), and 10.5 parts of a solution of a thermoplastic resin prepared as described in Example I. The composition was coated onto steel panels and the panels baked at 325°F. for 30 minutes, cooled, immersed in xylene for 2 minutes and dried. Opaque white films were obtained.

A panel containing the microporous film described hereinabove may be treated by soaking the panel in a 50 percent solution of toluene diisocyanate in xylene. After soaking for a sufficient length of time, in order that the microvoids become charged with the toluene diisocyanate solution, the panel was then withdrawn and permitted to dry. Subsequently, an acrylic polyamine resin (described hereinbelow) is drawn down on top of this charged microporous film and the resulting system baked at 350°F. for 5 minutes. The resulting system was tack free and had a pleasing appearance.

The acrylic polyamine resin employed hereinabove had a 50 percent solids content reduced in Pentoxone and was comprised of the following components:

230.4 parts methacrylic acid
1008.0 parts methylmethacrylate
892.8 parts butyl methacrylate
748.8 parts 2-ethylhexyl acrylate
300.0 parts N-hydroxylethyl ethylenimine.

EXAMPLE III

In this Example, a microporous film was charged with zinc chloride to cure a difunctional unsaturated cyclic ether in the following manner:

A panel containing a microporous film was prepared as follows: A butylated urea-formaldehyde resin was prepared by first forming a reaction mixture comprising one mole of urea and 2.22 moles of formaldehyde as a 40 percent solution in butanol. This solution usually comprises about 50 percent of reactants considered as solids in the butyl alcohol. The mixture is refluxed at a pH of 8.5 for about one hour. The solution is then acidified to a pH in the range of about 3.5 to 4 and refluxing is further continued until a temperature of 229°F. is reached. Subsequently, butanol is distilled off until a temperature of 250°F. is attained, at which point the heat is shut off. The mixture is cooled and thinned with xylene to a 50 percent concentration, at which point the solvent system comprises about equal parts of butanol and xylene and the Gardner-Holdt viscosity is about X. The acid value is usually approximately 0.5. The resultant resin solution contains adequate $-\text{NCH}_2\text{OH}$ and $-\text{NCH}_2\text{O}-\text{butyl}$ groups to crosslink a hydroxyl-containing resin.

To 12.0 parts of the butylated urea-formaldehyde resin solution prepared as described above there were added 12.0 parts of the solution of acrylic interpolymer described in Example I and 6.0 parts of a solution comprising 53 percent of xylene and 47 percent of a thermoplastic resin obtained by copolymerizing a monomer mixture comprising 50 percent methyl methacrylate, 40 percent 2-ethylhexyl acrylate and 10 percent dibutyl fumarate. The composition was thoroughly admixed and coated onto plain metal panels. The coated panels were flash dried for ½ hour, cooled, immersed in xylene for 2 minutes and dried. The films on the panels were white and opaque and not soluble in xylene.

This microporous film may then be charged by soaking the panel in a zinc chloride solution (50 percent in ethanol). The panel may be simply immersed in the solution and withdrawn after a period of time and permitted to dry. Because of the viscosity of the zinc chloride solution, it may be desirable to dilute the solution by employing small amounts of methanol. This will provide for faster drying when the panel is withdrawn from the zinc chloride solution. A 3 mil thick film of an unsaturated cyclic ether (described hereinbelow) may be applied to the charged microporous film and baked at 350°F. for about one-half hour. Although there may be some imperfections in the color, this system generally provides for a tough, strongly-bonded composition.

The unsaturated cyclic ether employed hereinabove is [3,4-dihydro-2H-pyran-2-methyl(3,4-dihydro-2H-pyran-2-carboxylate)] and may be prepared by reacting acrolein dimer (2200 parts) in the presence of 11.25 parts of aluminum isopropoxide, which is dissolved in 22.5 milliliters of carbon tetrachloride. For a more complete description of the preparation of this type of vinyl ether, see U.S. Pat. No. 2,537,921, Example I in Column 10.

EXAMPLE IV

In this Example, an adhesive bonding system was prepared by providing two substrates, each having thereon a microporous polymeric film containing discrete, open voids having located therein a curing agent for an epoxy resin system. An epoxy resin was applied on one of the charged films, then the second substrate is contacted with the first in such a manner that epoxy resin is sandwiched between and contacted with each of the charged substrates, and subsequently cured.

A panel containing a microporous film was prepared as follows: 100 parts of a 50 percent solids solution of Epon 1007 (a Bisphenol A type glycidyl ether resin - Shell Chemical Company) in acetone was mixed with 36 parts of a 60 percent solids solution of Uformite F-240 (a urea-formaldehyde resin — Rohm & Haas Co.). To the resulting mixture there was then added 7 parts of a 10 percent catalyst solution (Polycat 200, N-cyclohexylsulfamic acid) and 15 parts of hexane and the mixture stirred with a high speed agitator. The mixture was then applied onto steel panels, allowed to dry for about 2 hours at room temperature, and then baked for one minute at 310°F.

The resulting panels with microporous films thereon were then charged with diethylenetriamine, a curing agent for epoxy resins, by immersing them into a 50 percent solution of this amine in ethanol, wiping the film surfaces clean and allowing them to dry. A 2 mil film of a liquid epoxy resin (Epon 828 — a reaction product of epichlorohydrin and Bisphenol A) was applied to one of the steel panels and the film was then covered with another panel also having thereon a charged microporous film. The resulting assembly composed of two charged microporous films on panels and a film of the epoxy resin between them was then allowed to cure at room temperature for about 24 hours. At the end of this time a strong adhesive bond was developed between the two panels. Curing of this epoxy adhesive system may be accelerated by heating the assembly above room temperature, for example at 300°F. for 15 minutes.

It is understood that other resins may be employed to form the microporous polymeric films herein. For example, thermosetting resins which may be used in the practice of this invention are admixtures of interpolymers of hydroxyl esters of ethylenically unsaturated acids with at least one other copolymerizable, ethylenically-unsaturated monomer and a crosslinking agent such as an aminoplast resin. Likewise, admixtures of alkyd resins and cross-linking agents therefor, such as aminoplast resins, may be employed. Generally, alkyd resins are obtained by the condensation of a polyhydric alcohol and a polycarboxylic acid. Thermosetting resin compositions comprising mixtures of an interpolymer of a hydroxyalkyl ester and an aminoplast resin, such as those described in U.S. Pat. No. 2,681,897, may readily be employed. Another group of thermosetting resins which may be used are carboxylic acid amide interpolymers of the type disclosed in U.S. Pat. Nos. 3,037,963 and 3,118,853.

It is also understood that various other types of curing agents can be employed in the manner of the foregoing examples. These include tertiary amines, amine adducts, acid anhydrides, condensation products of phenol, urea and the like, as well as complexes of boron trifluoride, monoethylamine, and the like.

Other curable polymers useful as described in the examples include phenylplast, silicon polymers, epoxy resins, and the like.

Thus, it is understood that various other systems and compositions may be prepared without departing from the spirit and the scope of this invention. Therefore, the only such limitations which should be imposed are those indicated in the appended claims.

I claim:

1. A method of bonding two surfaces together comprising:
   A. forming on one of said surfaces a polymeric film which contains a plurality of discrete, open voids;
   B. charging said voids with a curing agent for an epoxy resin system;
   C. providing a layer of curable but uncured epoxy resin system between said charged film and the other of said surfaces;
   D. contacting said charged film with said uncured resin system and said uncured epoxy resin system with said other of said surfaces; and
   E. curing said epoxy resin system to thereby effect an adhesive bond between the two surfaces.

2. A method according to claim 1 wherein said film is formed by applying to one of said surfaces a film composition comprising:
   A. a thermosetting resin; and
   B. a solvent-extractable, thermoplastic resin, said resins being at least partially compatible before said thermosetting resin is cured, curing said thermosetting resin, and extracting said thermoplastic resin from said film.

3. A method according to claim 2 wherein said thermosetting resin is an epoxy resin.

4. A method of bonding two surfaces together comprising:
- A. forming on one side of each of said surfaces a polymeric film which contains a plurality of discrete, open voids;
- B. charging said voids with a curing agent for a thermosetting resin system;
- C. applying a layer of curable but uncured thermosetting resin to one of said charged films;
- D. contacting the other charged film with said uncured thermosetting resin; and
- E. curing said thermosetting resin to thereby effect an adhesive bond between the two surfaces.

5. A method according to claim 4 wherein at least one of said films is formed by applying to said surface a film composition comprising:
- A. a thermosetting resin; and
- B. a solvent-extractable, thermoplastic resin, said resins being at least partially compatible before said thermosetting resin is cured, curing said thermosetting resin, and extracting said thermoplastic resin from said film.

6. A method according to claim 5 wherein said thermosetting resin is an epoxy resin.

* * * * *